United States Patent
Dougherty et al.

(10) Patent No.: US 7,388,846 B1
(45) Date of Patent: Jun. 17, 2008

(54) CELLULARIZED PACKETIZED VOICE AND DATA

(75) Inventors: Angus O. Dougherty, Westminster, CO (US); Donald L. Hohnstein, Greeley, CO (US); Charles I. Cook, Louisville, CO (US); Guy M. Wells, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/505,271

(22) Filed: Feb. 16, 2000

Related U.S. Application Data

(60) Provisional application No. 60/152,730, filed on Sep. 8, 1999.

(51) Int. Cl.
*H04H 20/71* (2008.01)
(52) U.S. Cl. .............. 370/312; 370/328; 370/349; 370/350
(58) Field of Classification Search .......... 370/338, 370/349, 352–356, 395.5, 395.52, 462, 465, 370/466, 312, 328, 350
See application file for complete search history.

(56) References Cited

U.S. PATENT DOCUMENTS

| | | | |
|---|---|---|---|
| 4,317,229 A | 2/1982 | Craig et al. |
| 4,881,082 A | 11/1989 | Graziano |
| 4,930,118 A | 5/1990 | Sugihara |
| 5,068,916 A | 11/1991 | Harrison et al. |
| 5,150,473 A | 9/1992 | Zulch |
| 5,195,016 A | 3/1993 | Powers |
| 5,257,257 A | 10/1993 | Chen et al. |
| 5,315,584 A | 5/1994 | Savary et al. |
| 5,339,316 A | 8/1994 | Diepstraten |
| 5,341,395 A | 8/1994 | Bi |
| 5,353,300 A | 10/1994 | Lee et al. |
| 5,390,170 A | 2/1995 | Sawant et al. |

(Continued)

FOREIGN PATENT DOCUMENTS

WO    WO 97/29605    8/1997

(Continued)

OTHER PUBLICATIONS

Bo Ryo et al., Managing IP Services over a PACS Packet Network, IEEE Network, Jul./Aug. 1998, pp. 4-10.

(Continued)

*Primary Examiner*—Joseph Feild
*Assistant Examiner*—Inder Pal Mehra
(74) *Attorney, Agent, or Firm*—Brooks Kushman P.C.

(57) ABSTRACT

Distributed routing provides a robust, scalable communication system free of bottlenecks associated with traditional wireless systems. The system includes subscriber units sending and receiving information packets using wireless communication links. The system also includes access points with each access point forming a coverage area for exchanging information packets with subscriber units within the coverage area. The system further includes distribution points receiving packets from access points. Distribution points form a distributed routing network. Each distribution point receives an information packet for distribution to a specified destination. If the destination is to a subscriber unit within the coverage area of the access point in communication with the distribution point, the information packet is forwarded to the access point. Otherwise, the information packet is forwarded to one of the additional distribution points.

50 Claims, 5 Drawing Sheets

U.S. PATENT DOCUMENTS

| | | | |
|---|---|---|---|
| 5,400,040 A | 3/1995 | Lane et al. | |
| 5,406,550 A | 4/1995 | McTiffin | |
| 5,408,237 A | 4/1995 | Patterson et al. | |
| 5,410,568 A | 4/1995 | Schilling | |
| 5,461,610 A | 10/1995 | Weerackody | |
| 5,473,602 A | 12/1995 | McKenna et al. | |
| 5,475,732 A * | 12/1995 | Pester, III | 379/32.01 |
| 5,479,400 A | 12/1995 | Dilworth et al. | |
| 5,504,744 A | 4/1996 | Adams et al. | |
| 5,513,183 A | 4/1996 | Kay et al. | |
| 5,517,504 A * | 5/1996 | Tran et al. | 370/347 |
| 5,517,617 A | 5/1996 | Sathaye et al. | |
| 5,526,376 A | 6/1996 | Kellenberger et al. | |
| 5,563,892 A | 10/1996 | Kostreski et al. | 370/487 |
| 5,566,165 A * | 10/1996 | Sawahashi et al. | 370/342 |
| 5,572,528 A | 11/1996 | Shuen | |
| 5,590,133 A | 12/1996 | Billstrom et al. | |
| 5,640,414 A * | 6/1997 | Blakeney et al. | 375/130 |
| 5,641,141 A | 6/1997 | Goodwin | |
| 5,646,635 A | 7/1997 | Cockson et al. | |
| 5,673,263 A | 9/1997 | Basso et al. | |
| 5,673,264 A | 9/1997 | Hamaguchi | 370/397 |
| 5,708,659 A | 1/1998 | Rostoker et al. | |
| 5,715,250 A | 2/1998 | Watanabe | |
| 5,726,984 A | 3/1998 | Kubler et al. | |
| 5,729,549 A | 3/1998 | Kostreski et al. | |
| 5,737,328 A | 4/1998 | Norman et al. | |
| 5,737,333 A | 4/1998 | Civanlar et al. | |
| 5,761,195 A | 6/1998 | Lu et al. | |
| 5,764,645 A | 6/1998 | Bernet et al. | |
| 5,793,758 A | 8/1998 | Penners | |
| 5,805,996 A | 9/1998 | Salmela | |
| 5,809,415 A | 9/1998 | Rossmann | |
| 5,815,809 A | 9/1998 | Ward et al. | |
| 5,819,182 A | 10/1998 | Gardner et al. | |
| 5,825,759 A | 10/1998 | Liu | |
| 5,828,844 A | 10/1998 | Civanlar et al. | |
| 5,872,588 A | 2/1999 | Aras et al. | 725/14 |
| 5,886,738 A | 3/1999 | Hollenbeck | |
| 5,889,770 A | 3/1999 | Jokiaho et al. | |
| 5,890,055 A | 3/1999 | Chu et al. | |
| 5,894,478 A | 4/1999 | Barzegar et al. | |
| 5,896,369 A | 4/1999 | Warsta et al. | |
| 5,898,904 A * | 4/1999 | Wang | 340/7.27 |
| 5,901,356 A | 5/1999 | Hudson | |
| 5,903,559 A | 5/1999 | Acharya et al. | |
| 5,907,555 A | 5/1999 | Raith | |
| 5,907,816 A | 5/1999 | Newman et al. | |
| 5,909,430 A | 6/1999 | Reaves | |
| 5,930,247 A | 7/1999 | Miller, II et al. | |
| 5,935,209 A | 8/1999 | Budhraja et al. | |
| 5,936,754 A | 8/1999 | Ariyavistakul et al. | |
| 5,943,321 A | 8/1999 | St-Hilaire et al. | |
| 5,958,018 A | 9/1999 | Eng et al. | |
| 5,963,178 A | 10/1999 | Jones | |
| 5,970,406 A | 10/1999 | Komara | |
| 5,970,410 A | 10/1999 | Carney et al. | |
| 5,978,650 A | 11/1999 | Fischer et al. | |
| 6,006,096 A | 12/1999 | Trompower | |
| 6,009,096 A | 12/1999 | Jaisingh et al. | |
| 6,009,097 A | 12/1999 | Han | |
| 6,021,263 A | 2/2000 | Kujoory et al. | |
| 6,046,978 A | 4/2000 | Melnik | |
| 6,047,006 A * | 4/2000 | Brakefield et al. | 370/524 |
| 6,049,533 A | 4/2000 | Norman et al. | |
| 6,052,744 A | 4/2000 | Moriarty et al. | 710/27 |
| 6,061,579 A | 5/2000 | Arai et al. | |
| 6,069,592 A | 5/2000 | Wass | |
| 6,078,787 A | 6/2000 | Schefte et al. | |
| 6,091,788 A | 7/2000 | Keskitalo et al. | |
| 6,100,849 A | 8/2000 | Tsubaki et al. | |
| 6,108,314 A * | 8/2000 | Jones et al. | 370/294 |
| 6,128,512 A | 10/2000 | Trompower et al. | |
| 6,132,306 A | 10/2000 | Trompower | |
| 6,141,341 A | 10/2000 | Jones et al. | |
| 6,141,565 A * | 10/2000 | Feuerstein et al. | 455/560 |
| 6,175,747 B1 | 1/2001 | Tanishima et al. | |
| 6,219,563 B1 | 4/2001 | Pillekamp et al. | |
| 6,240,074 B1 | 5/2001 | Chandos et al. | |
| 6,243,585 B1 | 6/2001 | Pelech et al. | |
| 6,289,017 B1 | 9/2001 | Shani et al. | |
| 6,301,238 B1 | 10/2001 | Hagerman et al. | |
| 6,330,244 B1 | 12/2001 | Swartz et al. | |
| 6,351,237 B1 | 2/2002 | Martek et al. | |
| 6,359,901 B1 | 3/2002 | Todd et al. | |
| 6,363,070 B1 | 3/2002 | Mullens et al. | |
| 6,370,185 B1 | 4/2002 | Schmutz et al. | |
| 6,381,473 B1 | 4/2002 | Niki | |
| 6,405,049 B2 | 6/2002 | Herrod et al. | |
| 6,421,731 B1 | 7/2002 | Ciotti, Jr. et al. | |
| 6,487,457 B1 | 11/2002 | Hull et al. | |
| 6,505,255 B1 | 1/2003 | Akatsu et al. | |
| 6,510,152 B1 | 1/2003 | Gerszberg et al. | 370/352 |
| 6,512,756 B1 | 1/2003 | Mustajarvi et al. | |
| 6,526,581 B1 | 2/2003 | Edson | |
| 6,542,117 B1 | 4/2003 | Broughton | |
| 6,560,234 B1 | 5/2003 | Ben-Michael et al. | |
| 6,563,827 B1 * | 5/2003 | Brueckheimer et al. | 370/395.1 |
| 6,564,060 B1 | 5/2003 | Hoagland | |
| 6,577,643 B1 * | 6/2003 | Rai et al. | 370/466 |
| 6,584,080 B1 | 6/2003 | Ganz et al. | |
| 6,584,096 B1 | 6/2003 | Allan | |
| 6,587,457 B1 | 7/2003 | Mikkonen | |
| 6,587,468 B1 | 7/2003 | Dos Santos et al. | |
| 6,600,734 B1 | 7/2003 | Gernert et al. | |
| 6,628,627 B1 * | 9/2003 | Zendle et al. | 370/310 |
| 6,653,933 B2 | 11/2003 | Raschke et al. | |
| 6,738,637 B1 * | 5/2004 | Marinho et al. | 455/512 |
| 6,757,268 B1 * | 6/2004 | Zendle | 370/338 |
| 6,765,918 B1 | 7/2004 | Dixon et al. | |
| 6,795,863 B1 * | 9/2004 | Doty, Jr. | 709/231 |
| 6,850,512 B1 | 2/2005 | Bishop et al. | |
| 6,853,637 B1 | 2/2005 | Norrell et al. | |
| 2002/0037004 A1 | 3/2002 | Bossemeyer et al. | |
| 2002/0181485 A1 | 12/2002 | Cao et al. | |
| 2003/0144018 A1 | 7/2003 | Minnick et al. | |

FOREIGN PATENT DOCUMENTS

| | | |
|---|---|---|
| WO | WO 97/36405 | 10/1997 |
| WO | WO 97/48210 | 12/1997 |
| WO | WO 98/09440 | 3/1998 |
| WO | WO 98/26548 | 6/1998 |

OTHER PUBLICATIONS

Danny Cohen et al., IP Addressing and Routing in a Local Wireless Network, IEEE INFOCOM ' 92, Jun. 1992, vol. 2, pp. 626-632.

Anthony R. Noerpel et al., PACS: Personal Access Communications System—A Tutorial, IEEE Personal Communications, Jun. 1996, pp. 32-43.

Farook Khan et al., Multilevel Channel Assignment (MCA) for Wireless Personal Communications, IEEE, Apr. 5, 1997, pp. 1258-1262.

Eliminates Anarchy at the Internet Access Point and Improves Performance!, NetRoad TrafficWARE product information sheet by Ukiah Software, Inc., 1997.

Ralph Droms, Automated Configuration of TCP/IP with DHCP, IEEE Internet Computing, Jul.-Aug. 1999, pp. 45-53.

Product Catalog, Twist-Lock Photoelectric Controls 282 Series, www.fisherprice.com/282.htm, pp. 1-2.

* cited by examiner

CELLULARIZED PACKETIZED VOICE AND DATA

CROSS-REFERENCE TO RELATED APPLICATION

This application claims the benefit of U.S. Provisional Application No. 60/152,730 filed Sep. 8, 1999, titled "Cellularized Packetized Voice and Data," the specification of which is expressly incorporated herein by reference in its entirety.

TECHNICAL FIELD

The present invention relates to wireless communication systems handling a plurality of information types.

BACKGROUND ART

Communication systems are increasingly being required to provide a wide range of services, including different forms of information communicated and different communication characteristics. Information forms include voice, data, video, telemetry, and the like. Communication characteristics include quality, latency, reliability, cost, availability, portability, and the like. Infrastructure such as telecommunication systems, the Internet, and cable systems exist to provide long-haul routing and information content sourcing. However, difficulty remains in delivering this information to customers. This is particularly the case if the customer is located in a rural location, is communicating through portable equipment, or is mobile.

Traditionally, communication service providers have relied on copper wire or coaxial cable to connect distribution sites and subscriber premises. However, increases in the number of users, number and type of communication devices per user, and the information rate per device has strained the ability for traditional communication systems to provide the necessary bandwidth and flexibility. Various technologies including digital subscriber line (DSL) and video modems offer broadband access to the subscriber over existing copper or coaxial loop technologies. Fiber-to-the-home offers broadband access through additional wireline connections. While each technology has broadband delivery properties, each is subject to physical and signaling limitations that restrict availability in certain locations and for certain applications. For example, VDSL is limited to within approximately one kilometer of a connecting central office. Further, each central office usually cannot support high-speed access for every customer within the central office coverage area. Similarly, service provided by two-way cable modems is limited to the installation of coax, hybrid fiber coax and fiber-based systems by the cable provider. This currently results in many premises not having access to high-speed wireline voice, data, and video services.

Wireless systems, such as PCS and cellular systems, offer an alternative to wireline services. Typically, wireless systems include a centralized mobile switching center (MSC) responsible for routing calls, tracking user locations, billing information, and connectivity with other communication systems. The MSC is connected to base station controllers (BSCs), each of which supports one or more base transceiver stations (BTSs). Each BTS supports one or more cells based on the number and configuration of antennas supported by the BTS. Customers communicate with the wireless system through radio telephones when the telephone is within the coverage range of a cell. When a call is placed, a circuit-switched connection is established from the telephone, through the BTS and BSC, to the MSC. The MSC determines the destination and, if the destination is to another telephone within the wireless system, establishes a circuit-switched connection to the destination telephone. If the destination is outside of the wireless system, the MSC routes the call to a service provider for the outside destination.

Cellular and PCS wireless systems have traditionally focused on voice. However, recent introduction of digital radio in both the 800 MHz and 1.9 GHz permits low-speed data services, such as text messaging and one-way paging, to be implemented. Also, wireless modems implementing wireless application protocols may be incorporated into hand-held devices such as lap top personal computers and personal digital assistants (PDAs). Such devices may offer access to the Internet at rates up to 19.2 kilobits per second.

Several problems have developed with traditional wireless systems. First, because all calls are processed by the central MSC, it can become a bottleneck limiting the number of users supported. Second, if the MSC fails, the system becomes inoperative. Third, the BSC and BTS architecture is fairly rigid, requiring manual reconfiguration in the MSC when components are added or deleted. Fourth, circuit-switched channel connections establish an upper bandwidth, limiting communication rates. Fifth, bandwidth is wasted if the communication rate does not reach the maximum established by the communication channel. Sixth, high-speed data and video applications are impractical on wireless telecommunication systems designed primarily for voice.

An alternative wireless communication system is the local multipoint distribution system (LMDS). In LMDS, an antenna broadcasts high-bandwidth content to local receiving antennas. In the case of Internet access, the return path is typically through slow telephone lines. LMDS, like wireline cable systems, is asymmetrical, making it best suited for distribution of one-way entertainment signals such as television. LMDS also typically operates at a high carrier frequency, requiring receiving antennas to be positioned in line-of-site with the transmitting antenna.

What is needed is a communication system that provides voice, data, and video signals at rates appropriate for each user. The system should make efficient use of bandwidth, allocating only the bandwidth necessary for a particular communication. The system should be flexible, permitting automatic addition and deletion of network components. The system should have distributed routing and service provisioning to prevent bottlenecks, permit scaling, and increase reliability and robustness. The system should be wireless, accommodating a wide variety of fixed, portable, and mobile user communication devices. The system should support high-speed symmetric communication for applications such as video conferencing, real-time distributed document sharing, and the like.

DISCLOSURE OF INVENTION

It is an object of the present invention to provide cellularized wireless packetized access up to and including broadband rates.

It is another object of the present invention to provide cellularized packetized voice and data services in a wireless communication system.

It is still another object of the present invention to provide distributed routing of information packets in a wireless communication system.

It is yet another object of the present invention to provide the distribution and delivery of wireless voice and data services ubiquitously within the wireless coverage range.

It is a further object of the present invention to provide autonomous bandwidth allocation in a wireless communication system.

It is a still further object of the present invention to provide dynamic routing and connectionless packetized voice, data, and video services in a wireless communication system.

It is yet a still further object of the present invention to provide a communication system in which subscriber units can self-provision bandwidth allocation and service access coverage on a per transaction basis.

It is yet an additional object of the present invention to provide wireless packetized voice and data radios access to telecommunication and Internet systems.

It is yet another additional object of the present invention to provide a tiered wireless communication system that automatically adapts to the addition or deletion of network components.

In carrying out the above objects and other objects and features of the present invention, a communication system is provided. The communication system includes subscriber units sending and receiving information packets using wireless communication links. The system also includes access points. Each access point forms a coverage area for exchanging information packets with subscriber units within the coverage area. The system further includes distribution points. Each access point communicates with a distribution point. Each distribution point communicates with at least one additional distribution point. Each distribution point receives information packets with a specified destination. If the information packet destination is to a subscriber unit within the coverage area of an access point in communication with the distribution point, the information packet is forwarded to the access point. Otherwise, the information packet is forwarded to one of the additional distribution points. Packets may contain one or more of voice, data, video, streaming audio, streaming video, and the like. Communication links may be symmetrical or asymmetrical.

In various embodiments of the present invention, access points may be in wireline or wireless connection with a distribution point. Also, distribution points may be interconnected by wireline or wireless means. Further, access points may be packaged with a distribution point or may be remotely located from the distribution point.

In another embodiment of the present invention, the communication system includes a communication system interface device capable of formatting information contained in the information packet to pass through a second communication system. A distribution point which receives an information packet for distribution within the second communication system sends the information packet to the second communication system interface device. The second communication system may include a wireless or wireline telecommunication system, a data network such as the Internet, or a video distribution system.

In a further embodiment of the present invention, the distribution point may include one or more of an asynchronous transfer mode switch, an Internet protocol router, an Ethernet router, or a time division multiplexed switch.

In yet other embodiments of the present invention, a quality error bit rate is established for each subscriber unit based on one or more of the location of the subscriber unit within the communication system, the class of service, the grade of service, and the rate of service.

In yet a further embodiment of the present invention, bandwidth is dynamically allocated when an information packet is exchanged between one of the plurality of subscriber units and one of the plurality of access points.

A method for routing packets in a packetized communication system is also provided. Information is broken into a plurality of packets at a transmitting subscriber unit. The plurality of packets are transmitted to a distribution point in communication with the transmitting subscriber unit. Each packet is provided with an address identifying a destination distribution point within the communication system. In each distribution point along a path of distribution points to the destination distribution point, a determination is made as to which distribution point each packet will be forwarded based on the address. If the destination is a subscriber unit in communication with the destination distribution point, when each packet is received at the destination distribution point it is forwarded to the destination subscriber unit where the information is assembled from the plurality of packets.

In an embodiment, the method further includes determining that the destination is to a receiver outside of the communication network. Each packet is provided with an address specifying a destination distribution point functioning as a gateway to a communication system supporting the receiver. Each packet is forwarded from the gateway distribution point to the communication system supporting the receiver.

A distribution point for use in a communication system comprising a plurality of networked distribution points is also provided. The distribution point includes at least one front end communication interface for communicating with an access point, the access point in wireless communication with subscriber units currently assigned to the distribution point. The distribution point also includes at least one back end communication interface in communication with a back haul communication device. At least one back haul communication device sends packets to and receives packets from a back haul communication device in another of the networked distribution points. The distribution point further includes an intelligent packet switching device that determines a destination for each received packet and determines if the destination is to a subscriber unit currently assigned to the distribution point. If so, the packet is sent to the destination subscriber unit. If the destination is not to a subscriber unit currently assigned to the distribution point, the switching device determines if the destination is to a subscriber unit currently assigned to any other distribution point in the communication system. If so, another distribution point in back haul communication with the distribution point to which the packet should be forwarded is identified and the packet is forwarded to the identified distribution point.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
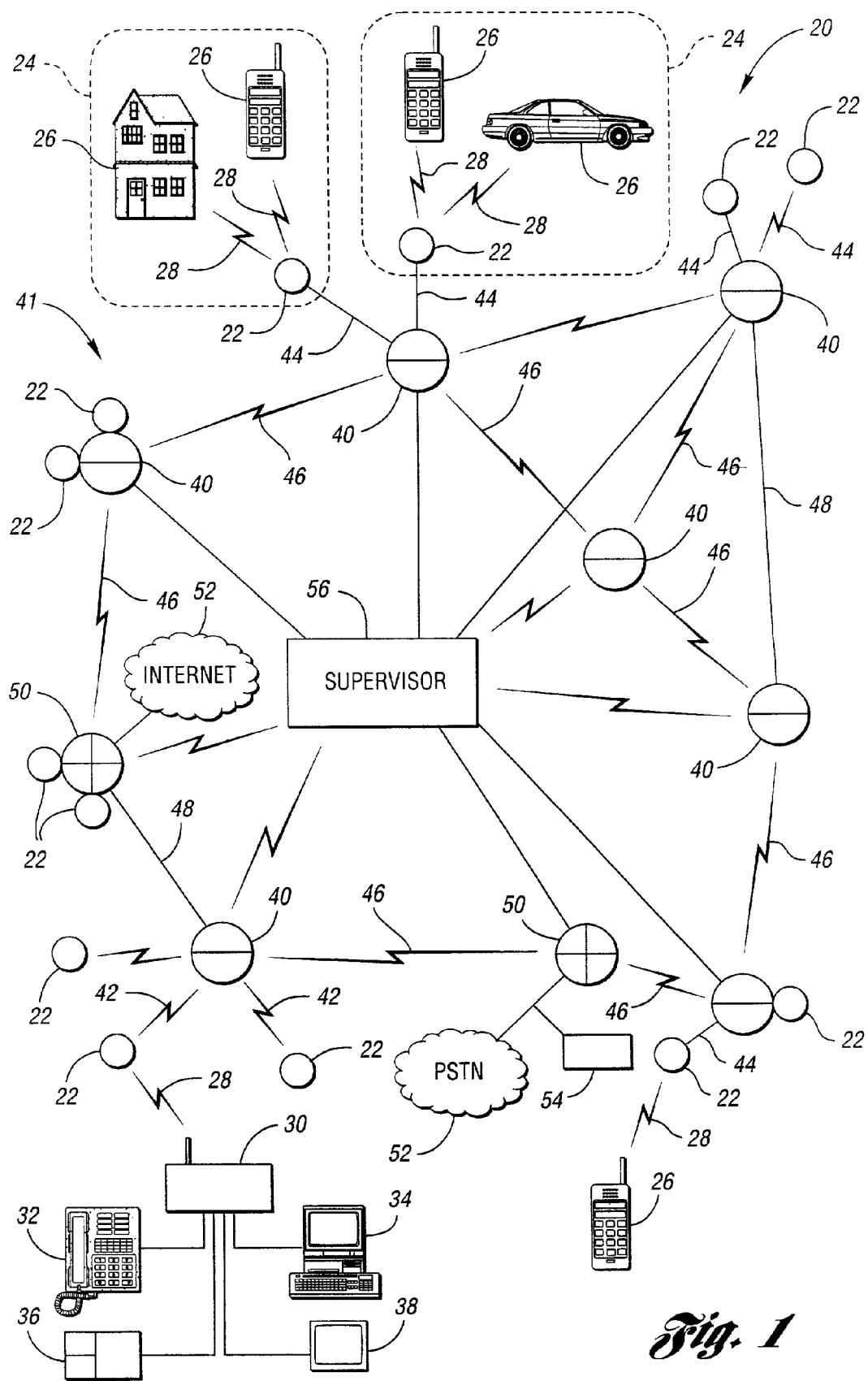
FIG. 1 is a schematic drawing illustrating a portion of a communication system according to an embodiment of the present invention.

Referring to FIG. 1, a schematic drawing illustrating a portion of a communication system according to an embodiment of the present invention is shown. A communication system, shown generally by 20, includes a plurality of access points 22 which may be, for example, a local radio access point (LRAP). Each access point 22 defines coverage area 24 such as, for example, a cell, covering a reception range of access point 22. Coverage area 24 may be formed from many independent sectors, as may result if access point 22 uses many unidirectional antennas, or may be a single region resulting from the use of an omnidirectional antenna. Subscriber unit 26 within coverage area 24 may establish two-way wireless link 28 with access point 22. Wireless link 28 may be symmetrical or asymmetrical. Subscriber unit 26 may be fixed or non-fixed and, if non-fixed, may posses varying degrees of portability and mobility.

Wireless link 28 may be any form of electromagnetic signaling not confined to a wire or cable, including energy radiated by antenna as well as visible and invisible light. As will be appreciated by one of ordinary skill in the art, wireless link 28 may be implemented by any access technology, including CDMA, TDMA, FDMA, OFDM, analog, and the like. Modulation techniques that may be used with the present invention include FSK, BPSK, QPSK, m-ary QAM, FM, AM, and the like. Further, the invention does not depend on modulation frequency. In a preferred embodiment, the access technology, frequency, and modulation method for establishing wireless link 28 are based, in part, on local geography, local regulations, noise and distortion sources, other operating wireless systems, cost, and the like. Subscriber unit 26 and access point 22 may establish wireless link 28 using a plurality of combinations of access technology, frequency, and modulation techniques.

Information transmitted in wireless link 28 may represent voice, data, video, streaming audio, streaming video, or the like. Types of information include speech, facsimile, computer data, entertainment and informational audio and video, video games, telemetry, security, and the like. If the information occurs as a continuous stream, subscriber unit 26 breaks the information into packets prior to packet transmission and reassembles the information stream from packets after packet reception. Any type of information that exists in packets or that may be packetized can be used with the present invention.

In an embodiment of the present invention, subscriber unit 26 may be implemented as part of terminal network controller 30 accepting inputs from and providing outputs to information sources including voice equipment 32, computing equipment 34, telemetry equipment 36, video equipment 38, and the like. Inputs to terminal network controller 30 may include serial data, parallel data, ISDN, standard telephone, xDSL, SR 1394, and the like.

In an embodiment of the present invention, a quality error bit rate is established for each subscriber unit 26. This quality error bit rate may be based on the location of subscriber unit 26 within communication system 20, the class of service assigned to subscriber unit 26, the grade of service assigned to subscriber unit 26, the data or transmission rate of service assigned to subscriber unit 26, and the like. The quality error bit rate may be modified while subscriber unit 26 is within communication system 20 to reflect changing conditions such as noise, demand, connectivity, and the like. Applications providing services to subscriber unit 26 may adjust these services based on the quality error bit rate. For example, an application providing streaming audio and video may reduce the frame update rate as noise increases, guaranteeing successful transmission at a lower information rate. The information rate may be further reduced to provide only still pictures and audio if conditions continue to worsen. The information rate may also be automatically changed if subscriber unit 26 moves between coverage areas 24 with differing transmission capabilities or loads.

Control of the information rate may be achieved by having subscriber unit 26 monitor a signaling channel transmitted by access point 22 for each coverage area 24. This signaling channel informs subscriber unit 26 when to transmit information, how much information to transmit, the information transmission rate, and the like. The signaling channel may be controlled by a central supervisor, described below.

In an embodiment of the present invention, bandwidth on communication link 28 is only consumed when packets containing information are transmitted. For example, each subscriber unit 26 surrenders bandwidth on communication link 28 when not sending or receiving an information packet. Packets to be transmitted are queued based on order of arrival, priority, a combination of arrival order and priority, or the like. Subscriber unit 26 monitors a signaling channel transmitted by access point 22 for each coverage area 24. Subscriber unit 26 only consumes bandwidth when instructed to transmit by the signaling channel or when receiving packets.

Each access point 22 communicates with at least one distribution point 40. Distribution point 40 contains both routing and switching functionality. Access point 22 may be in contact with one or more radio access distribution points 40 over radio link 42, may be wired or cabled to distribution point 40 through wireline link 44, or may be packaged with distribution point 40. Access point 22 may also be transformed into distribution point 40, permitting access point 22 to route traffic that neither originated nor terminated with any of its serviced subscriber units 26. Distribution point 40 is in communication with at least one additional distribution point 40, the collection of interconnected distribution points forming a network of distribution points, shown generally by 41. Two distribution points may be connected by radio link 46 or wireline link 48.

Distribution points 40 may route packets within distribution point network 41 under a variety of protocols such as ATM, TCP/IP, 802.x, or the like. In a preferred embodiment, distribution point 40 includes an ATM/IP switch. Distribution point 40 then operates at both the IP routing and ATM switching layers or, in terms of the Open Systems Interconnection (OSI) standard, at both the network layer and the data link layer.

The IP layer operates with a link-state protocol such as the open shortest path first (OSPF), quality OSPF (Q-OSPF), or internal gateway routing protocol (IGRP) and its derivatives. The IP layer operates as a single autonomous system (AS) within the IP frame of reference. Each system 20 will be allocated a unique and unambiguous AS number for system management. IP addresses for system 20 will use a private IP address space that cannot be routed within public systems such as the Internet. Subscriber units 26 within system 20 may be permitted access to the private IP address space or may be excluded from the private IP address space. When private IP address space is used for subscriber units 26, a network address translator (NAT) within system 20 allows subscriber units 26 access to the Internet. The ATM layer operates with the private network node interface (PNNI) routing protocol. ATM end system addresses (AESAs), managed by the service provider for system 20, are used by distribution point network 41.

The ATM network carries voice traffic. Through PNNI, the ATM/IP switch participates in switched or signaled virtual connections (SVCs). When subscriber unit 26 within system 20 requires voice connectivity, it signals such a request, which is serviced by distribution point 40 receiving that request. The IP network coresiding with the ATM network is used for data applications required by subscriber units 26. The IP network is also used for all network management, including management of ATM/IP switches, subscriber units 26, gear associated with distribution points 40, and the like. This includes functions such as alarming, monitoring, recovery systems, and the like. While described in the context of a wireless network application, it is readily apparent that ATM/IP routing as described herein may be applied to wireline and mixed wireline-wireless systems as well.

Each distribution point 40 receives an information packet from either another distribution point 40, from subscriber unit 26 in communication with distribution point 40 through access point 22, or from an external communication system. If distribution point 40 determines the information packet is destined for subscriber unit 26 within coverage area 24 of access point 22 in communication with distribution point 40, distribution point 40 forwards the packet to access point 22 forming coverage area 24 containing destination subscriber unit 26. If distribution point 40 determines the information packet is destined for subscriber unit 26 in coverage area 24 formed by access point 22 in communication with a different distribution point 40, distribution point 40 forwards the packet to one of distribution points 40 in communication with distribution point 40. Hence, no central MSC is required for routing. Distributed routing removes delays caused by central switching, increases the robustness of the communication system 20, and permits simplified expansion or reduction of communication system 20 by automatically adding or removing distribution points 40.

A third option is that distribution point 40 determines that the information packet is destined for a destination not part of communication system 20. Special distribution points, such as gateway 50, provide a bridge to additional communication systems 52 including wireless and wireline telecommunication systems, video distribution systems, computer network systems such as the Internet, packet systems, frame systems, ATM systems, IP systems, private networks, and the like. If distribution point 40 determines the information packet is destined for delivery outside of communication system 20, distribution point 40 forwards the packet to one of distribution points 40 in communication with gateway 50.

In an embodiment of the present invention, communication system 20 includes communication system interface device 54 operative to format information contained in the information packet to pass through telecommunication system 52. Communication system interface device 54 may be incorporated into gateway 50 or may be a separate component of communication system 20. Distribution point 40 receives at least one information packet from the telecommunication system interface device 54 and determines if the at least one information packet destination is to subscriber unit 26 within coverage area 24 of access point 22 in communication with distribution point 40. Distribution point 40 forwards the at least one information packet to access point 22 defining coverage area 24 containing subscriber unit 26 if the information packet destination is to subscriber unit 26 within coverage area 24 of access point 22 in communication with distribution point 40 and forwards the at least one information packet to one of the additional distribution points 40 in communication with distribution point 40 otherwise.

Each distribution point 40 communicates with supervisor 56. Supervisor 56 tracks the locations of subscriber units 26 within communication system 20, identifying with which distribution point 40 each subscriber unit 26 is currently communicating. Supervisor 56 manages transmission priorities based on parameters including load, information type, service requests, location, grade of service, information transfer rates, and the like. In an embodiment of the present invention, supervisor 56 also assigns an address to each distribution point 40 as distribution point 40 is added to communication system 20. Supervisor 56 provides each distribution point 40 with a logical address and a listing indicating to which additional distribution point 40 in communication with distribution point 40 information packets should be forwarded for each possible destination distribution point 40. The listing may be based on maintaining a minimum quality of service in the path through distribution point network 41 to the destination distribution point 40. Supervisor 56 periodically assesses the performance of network 41 by sending test messages. Reports may also be generated by distribution points 40 attempting to communicate with target addresses.

Supervisor 56 is shown in FIG. 1 as a separate component individually connected to each distribution point 40. Alternatively, communication between supervisor 56 and distribution points 40 may be through radio links 46 and wireline links 48. Supervisor 56 may be one or more separate components of communication system 20, may be incorporated into one of distribution points 40, or may be distributed amongst multiple distribution points 40.

In an embodiment of the present invention, a distribution point may be automatically added to or removed from distribution point network 41. When new distribution point 40 is first inserted into communication system 20, new distribution point 40 transmits a signature signal. Existing distribution points 40 within range of new distribution point 40 receive the signal and report it to supervisor 56. Supervisor 56 then determines if new distribution point 40 will be added to network 41. If so, supervisor 56 assigns new distribution point 40 a routing address and informs network 41 as needed. Each existing distribution point 40 in distribution point network 41 is provided with an indication as to which distribution point 40 in communication with existing distribution point 40 each information packet having a destination address specifying the new distribution point 40 is to be forwarded. If a distribution point 40 is removed from network 41, remaining distribution points 41 report the absence of removed distribution point 40 to supervisor 56. Supervisor 56 then informs network 41 as needed.

In an embodiment of the present invention, each subscriber unit 26 is autonomously registered with communication system 20 when subscriber unit 26 first enters coverage area 24 within communication system 20. Each subscriber unit 26 maintains registration as subscriber unit 26 moves from one coverage area 24 into another coverage area 24 within communication system 20 and is autonomously deregistered when subscriber unit 26 leaves communication system 20. To accomplish automatic registration and deregistration of subscriber units 26, each access point 22 periodically reports the status of subscriber units 26 within any controlled coverage area 24 to supervisor 56 performing registration and authentication. Each access point 22 communicates with subscriber units 26 to determine status. When a subscriber unit 26 voluntarily enters or leaves coverage area 24, such as by powering up or down, subscriber unit 26 transmits a particular signal to access point 22. Information is also received from subscriber unit 26 in response to periodic queries from network 20. Access point 22 may determine the absence of subscriber unit 26 from coverage area 24 if no communication is received after a particular time interval. Algorithms for registering and deregistering subscriber units 26 may be based on various factors including quality of service, traffic, location, service type, network topology, and the like.

Figure 2:
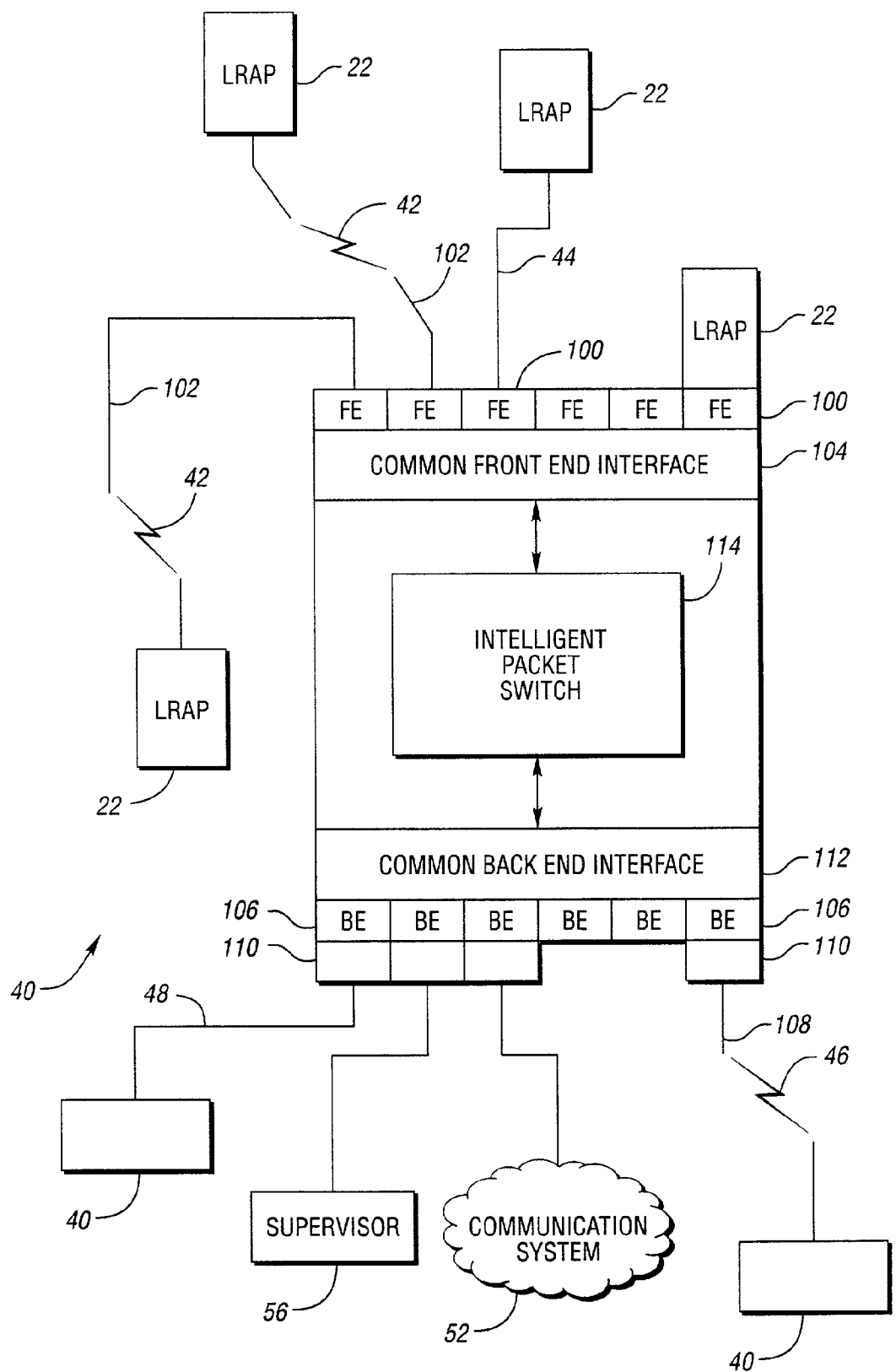
FIG. 2 is a block diagram of a distribution point according to an embodiment of the present invention.

Referring now to FIG. 2, a block diagram of a distribution point according to an embodiment of the present invention is shown. Distribution point 40 includes one or more front end communication interfaces 100, each front end interface communicating with one access point 22. In one configuration, access point 22 is packaged with distribution point 40. Front end interface 100 may provide a plug-in port for receiving access point 22. In another configuration, front end interface 100 connects to antenna 102 for establishing radio link 42 with access point 22. In a further configuration, front end interface 100 accepts wireline link 44 connecting distribution point 40 with access point 22. Front end interface 100 operates using a standard packet switching protocol such as, for example, ATM25. Each front end communication interface 100 passes information packets through common front end switch interface 104 operating under a packet protocol such as ATM, TCP/IP, 802.x, or the like.

Distribution point 40 also includes back end communication interfaces 106 for connecting distribution point 40 with additional distribution points 40, with supervisor 56, and, if distribution point 40 is a gateway 50, with telecommunication systems, private network systems, video distribution systems, the Internet, or the like. This may be typically referred to as back haul communication. In one configuration of the present invention, back end interface 106 connects to antenna 108 for establishing radio link 46 with another distribution point 40. In another configuration, back end interface 104 accepts wireline link 44 connecting distribution point 40 with another distribution point 40. In a preferred embodiment, back end interface 106 accepts modules 110 for interfacing through a variety of protocols and media such as ATM25, DS1, DS3, OC3, 1000Base-T, 100Base-T, and the like. Each back end communication interface 106 passes information packets through common back end switch interface 112 operating under a packet protocol such as ATM, TCP/IP, or the like. In a preferred embodiment, distribution point 40 dynamically allocates bandwidth when the information packet is forwarded to one of the additional distribution points 40 in communication with distribution point 40.

Intelligent packet switch 114 received information packets through common front end switch interface 104 and common back end switch interface 112 and routes the packets between front end interfaces 100 and back end communication interfaces 106. Switch 114 may be a packet switching device as is known in the art such as an ATM switch, an IP switch, a TDM switch, a switch working under the 802.11 specification, or any other suitable alternative or combination having the required switching functionality. In an embodiment of the present invention, switch 114 includes an ATM portion for voice and video routing and an IP portion for data routing as well as administration, management, and network topology control.

In an embodiment of the present invention, distribution point 40 is enclosed in an environmentally sealed package. This permits distribution point 40 to be mounted outside, such as on a pole or the side of a building. In keeping with the invention, however, distribution point 40 need not be outside so long as it can communicate with access points 22, additional distribution points 40, supervisor 56, and the like.

Figure 3:
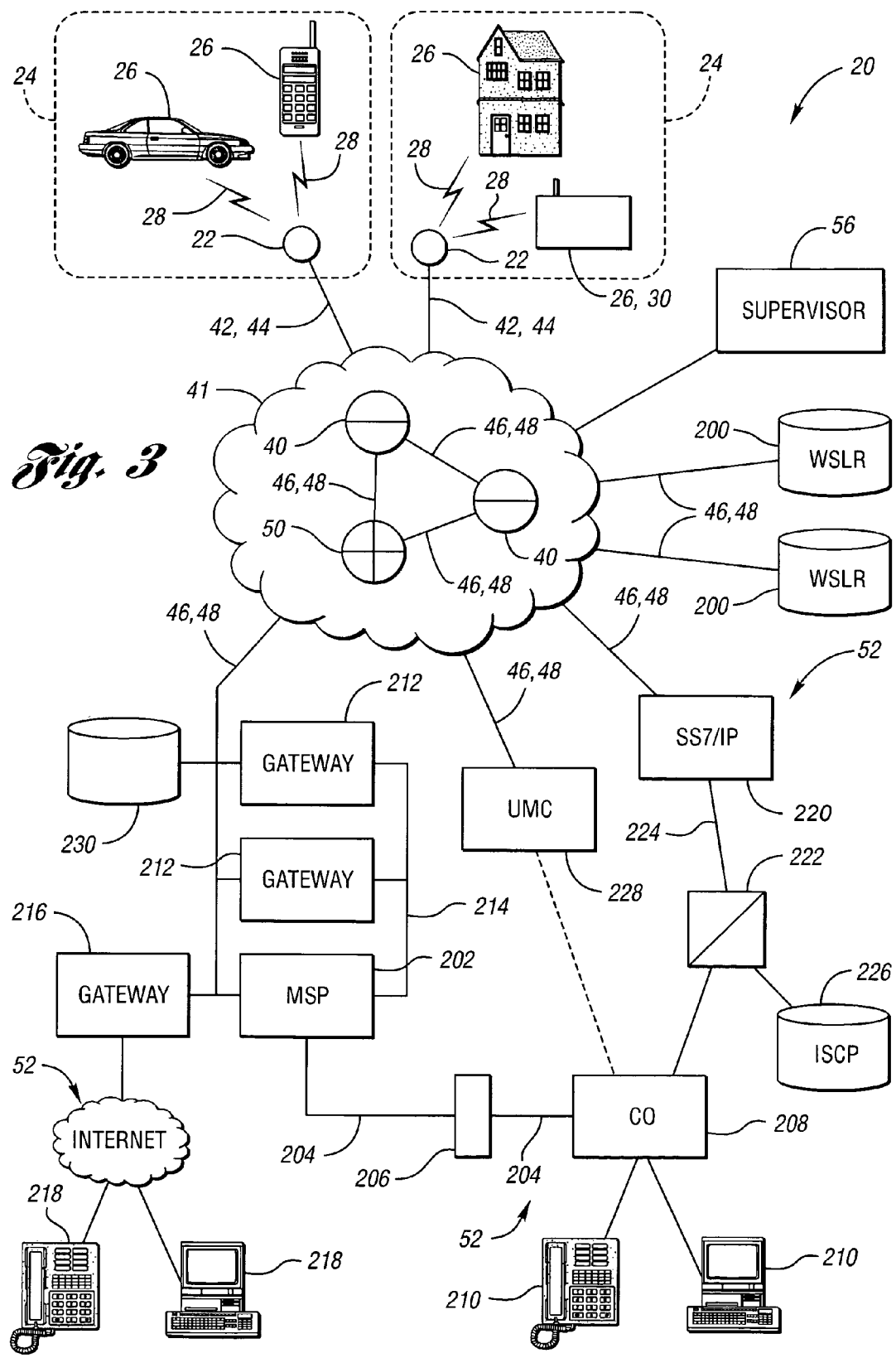
FIG. 3 is a schematic drawing illustrating an implementation of a communication system according to an embodiment of the present invention.

Referring now to FIG. 3, a schematic drawing illustrating an implementation of a communication system according to an embodiment of the present invention is shown. This implementation provides an example including interfaces between communication system 20 and a variety of external communication systems 52.

Communication system 20 includes wireless service location registers (WSLRs) 200 providing common subscriber and service databases. Each WSLR 200 communicates with at least one distribution point 40 and one additional communication system 52. Connections between WSLRs 200 and communication systems 52 are not shown in FIG. 3 for clarity. Each WSLR 200 provisions requested services from additional communication system 52. For example, WSLR 200 may provide centralized mobility and location management. Supervisor 56 determines which WSLR 200 will provision services based on the distribution point 40 through which subscriber unit 26 requesting services is currently communicating. A device that may serve as WSLR 200 is described in U.S. Pat. No. 5,974,331 titled "Method And System For Dynamically Assigning Features And Users To Wireline Interfaces," to Cook et al., which is herein incorporated by reference.

Communication system 20 may also include multi-service platform (MSP) 202. MSP 202 provides access to wireline telephone systems (PSTN). This may be accomplished through GR-303 compliant connection 204. Signaling point of interface (SPOI) 206 serves as the demarcation point between communication system 20 and external communication system 52. In the example shown, GR-303 connection 204 connects wireline provider 208, serving wired customers 210, with communication system 20. MSP 202 may integrate both PSTN and IP networks as well as provide enhanced circuit/packet switch services.

At least one gateway 212 supports MSP 202. Communication system 20 may include, for example, voice-over-ATM (VoATM) to GR-303 gateways and voice over IP (VoIP) to GR-303 gateways. Gateway 212 serves as a call agent, converting information packets to a format acceptable to additional communication system 52. A determination as to which gateway 212 will process an information packet may be based on information contained within the information packet. Gateways 212 may be connected to MSP 202 by GR-303 compliant connection 214.

Communication system 20 may also include gateway 216 connecting communication system 20 with external data network 52 such as the Internet or a private data network interconnecting network users 218. Gateway 216 may, for example, convert between various packet-based standards such as H.323 and SIP.

Communication system 20 may also include gateway 220 interfacing communication system 20 with external SS7 network 52 represented by signal transfer point (STP) 222. SS7/IP gateway 220 communicates with STP 222 through ISUP compliant connection 224 which permits setting up and taking down trunk calls, calling party information services, call status, and the like, by passing signaling information through SS7 network 52 to wireline provider 208 under the control of integrated services control point (ISCP) 226.

Communication system 20 may also include unified message center (UMC) 228. Unified messages, also known as integrated messages, permit messages from a variety of sources such as telephone, email, fax, reports, compound documents, and the like, to be summarized and presented on a single medium, such as a personal computer. Messages may even be translated from one media type to another. UMC 228 supports unified message applications within communication system 20. In an embodiment, UMC 228 communicates with wireline provider 208, permitting greater integration, flexibility and access to messages.

Connection controller 230 controls access to gateways 50, 212, 216, 220, and the like. For example, connection controller 230 may manage voice over ATM to GR-303 access, voice over IP to GR-303 access, H.323/SIP to Internet remote access, SS7 to IP access, and the like. Connection controller 230 may also support information rate adaptation including open application processor interfaces and robust application development platforms.

Figure 4:
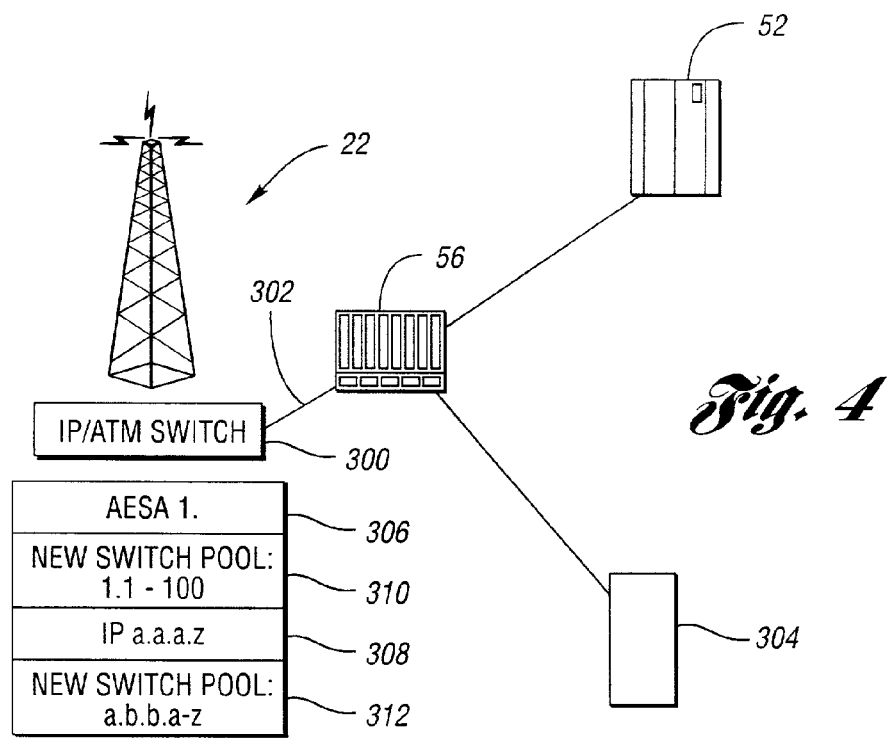
FIG. 4 is a schematic drawing illustrating an initial state for a communication system according to an embodiment of the present invention.
Figure 5:
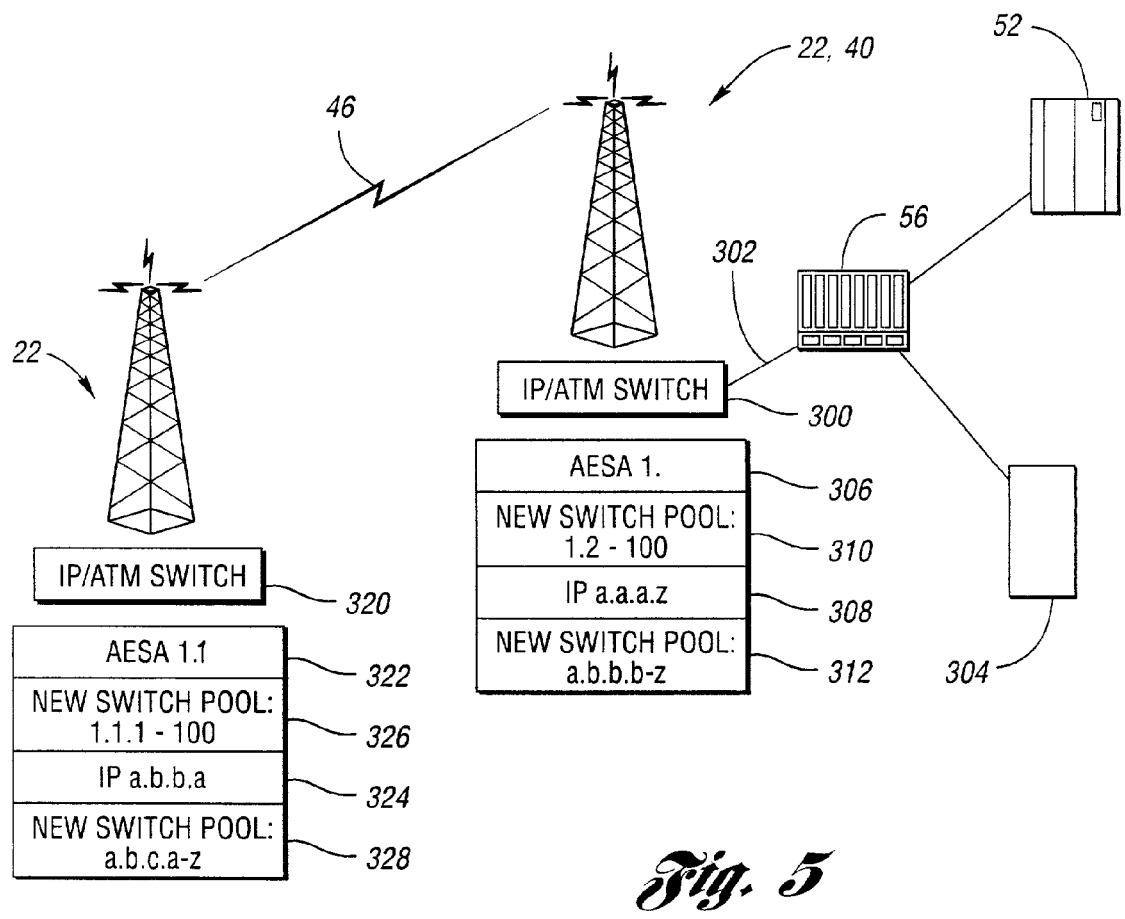
FIG. 5 is a schematic drawing illustrating the addition of a second access point to the communication system of FIG. 4 according to an embodiment of the present invention.
Figure 6:
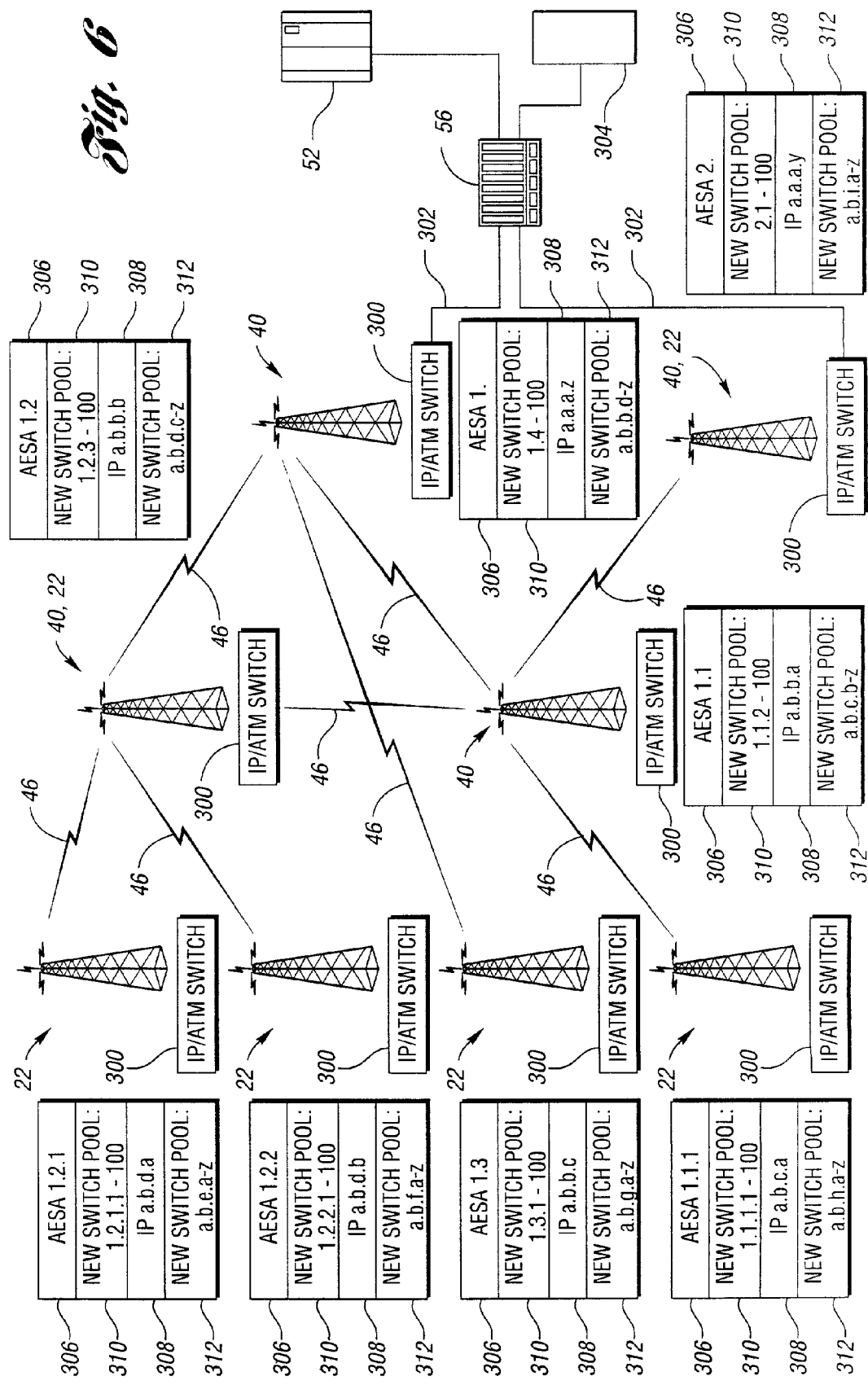
FIG. 6 is a schematic drawing illustrating a hierarchical routing system using ATM/IP switches according to an embodiment of the present invention.

Referring now to FIGS. 4-6, drawings illustrating dynamic growth of a distribution point network according to an embodiment of the present invention are shown. An initial configuration for system 20 is shown in FIG. 4. ATM/IP switch 300 is in communication with supervisor 56 through ATM virtual connection 302. In this simple configuration, ATM/IP switch 300 may be functioning as access point 22. ATM/IP switch 300 may obtain an IP address and an ATM address either manually or automatically.

ATM/IP switch 300 automatically requests addresses by first broadcasting an ATM request in an IP packet over virtual connection (VC) 302. Supervisor 56 forwards this request to address server 304. Address server 304 responds by allocating unique AESA 306 to the address assignment client in ATM/IP switch 300, which updates the ATM layer with new address 306. The address assignment client in ATM/IP switch 300 next requests from address server 304 an IP address, again using IP as the transport service over pre-existing ATM VC 302. Address server 304 forwards IP address 308 to ATM/IP switch 300. ATM/IP switch 300 then requests address pools for ATM and IP. Address server 304 responds by supplying AESA pool 310 and IP address pool 312. Pools of addresses 310, 312 are used by switch 300 when functioning as distribution point 40 in support of other distribution points 40 and access points 22.

Referring now to FIG. 5, a drawing illustrating the addition of a second access point is shown. Access point 22 has the capability to function as a distribution point 40. As new access points 22 are subtended from an existing access point 22, existing access point 22 becomes a distribution point 40. Each distribution point 40 continues to communicate with its initially connected distribution point 40 and with other distribution points 40 as they are provisioned. As new links 46 between distribution points are created, distribution points 40 form peer relationships at both the ATM layer and the IP layer. Distribution points 40 are always peers at the IP and ATM layer, while access points 22 are clients of distribution points 40. As such, each ATM/IP switch 300 functions as a server when operating as distribution point 40 and as a client when operating as access point 22.

When new ATM/IP switch 320 is instantiated as access point 22, it will automatically request an ATM address in an IP packet address assignment request. This IP packet will be sent in an ATM frame over radio link 46 to IP/ATM switch 300 functioning as distribution point 40 using a pre-existing ATM VC. IP/ATM switch 300 will allocate unique ATM address 322 from AESA pool 310 and unique IP address 324 from IP address pool 312. ATM/IP switch 320 then sends a directed request to address server 304 and receives its own AESA pool 326 and IP address pool 328.

Referring now to FIG. 6, a hierarchical routing network is shown. Address server 304 assigns AESA pool 310 and IP address pool 312 as each ATM/IP switch 300 is added. By handling all requests for address pools 310, 312, address server 304 maintains a hierarchy of addresses for both ATM and IP layers. Address server 304 constructs routing tables for each ATM/IP switch 300 indicating to which directly connected ATM/IP switch 300 each incoming packet should be routed if the packet is not destined to subscriber unit 26 serviced by that ATM/IP switch 300. Thus, routing tables are cohesive, reflecting the view of communication system 20 seen by each ATM/IP switch 300. Address server 304 also constructs forward equivalency class (FEC) tables permitting ATM/IP switch 300 to route packages based on package contents. FECs can be seen as either the virtual path identifier (VPI) portion of the ATM VPI/VCI or as the entire VPI/VCI, and are enabled by the routing protocols at the IP and PNNI layers.

When subscriber unit 26 first enters communication system 20, it is detected and serviced by access point 22. Subscriber unit 26 is provided with one or more addresses, each address routable within at least the local hierarchy of ATM/IP switches 300. If subscriber unit 26 enters the range of a new access point 22, new access point 22 sends out a flooding FEC routing update for the ATM address of subscriber unit 26. Previously servicing access point 22 removes subscriber unit 26 from its own FEC upon receiving the FEC update. Any subsequent ATM packets received by previously servicing access point 22 are discarded.

When subscriber unit 26 changes access points 22, the IP routing portion of system 20 moves the IP address of subscriber unit 26 from one FEC class to another. Any IP packets remain untouched, with only a label or equivalence changed. In one embodiment, the label is the VPI portion of the VC. In another embodiment, multiprotocol label switching (MPLS) is used to provide an additional label. In either case, the IP address and virtual connection identifier (VCI) are retained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A communication system comprising:
   a plurality of subscriber units, each subscriber unit sending and receiving information packets using a wireless communication link;

a plurality of access points, each access point forming a coverage area for exchanging information packets with subscriber units within the coverage area through at least one wireless communication link; and a plurality of distribution points, each distribution point in communication with at least one access point and with at least one additional distribution point, each distribution point operative to (a) receive an information packet for distribution to a destination within the communication system, (b) determine if the information packet destination is to one of the plurality of subscriber units within the coverage area of an access point in communication with the distribution point, (c) forward the information packet to the access point defining the coverage area containing the subscriber unit if the information packet destination is to one of the plurality of subscriber units within the coverage area of the access point in communication with the distribution point, and (d) forward the information packet to one of the additional distribution points in communication with the distribution point if the information packet destination is not to one of the plurality of subscriber units within the coverage area of the access point in communication with the distribution point.

2. The communication system of claim 1 wherein each information packet includes at least one of voice, video, and data information.

3. The communication system of claim 1 wherein at least one information packet comprises voice information.

4. The communication system of claim 1 wherein at least one information packet comprises video information.

5. The communication system of claim 1 wherein at least one information packet comprises data.

6. The communication system of claim 1 wherein at least one information packet comprises streaming audio.

7. The communication system of claim 1 wherein at least one information packet comprises streaming video.

8. The communication system of claim 1 wherein the communication link is a symmetric link.

9. The communication system of claim 1 wherein the communication link is an asymmetric link.

10. The communication system of claim 1 wherein each distribution point is in wireless communication with at least one of the at least one access point.

11. The communication system of claim 1 wherein at least one distribution point is in wireline communication with at least one of the at least one access point.

12. The communication system of claim 1 wherein at least one of the at least one access point is packaged with a distribution point.

13. The communication system of claim 1 wherein at least one of the plurality of access points is not collocated with any distribution point.

14. The communication system of claim 1 wherein at least one of the plurality of distribution points is in wireless communication with at least one additional distribution point of the plurality of distribution points.

15. The communication system of claim 1 wherein the plurality of distribution points forms a wireless network of distribution points.

16. The communication system of claim 1 further comprising a communication system interface device operative to format information contained in the information packet to pass through a second communication system, the distribution point further operative to receive an information packet for distribution within the second communication system and to send the information packet to the communication system interface device.

17. The communication system of claim 16 wherein the second communication system comprises a wireless telecommunication system.

18. The communication system of claim 16 wherein the second communication system comprises a wireline telecommunication system.

19. The communication system of claim 16 wherein the second communication system comprises a data network.

20. The communication system of claim 16 wherein the second communication system comprises a video distribution system.

21. The communication system of claim 1 further comprising a telecommunication system interface device operative to format information contained in the information packet to pass through a telecommunication system, the distribution point further operative to:

receive at least one information packet from the telecommunication system interface device;

determine if the at least one information packet destination is to a subscriber unit within the coverage area of an access point in communication with the distribution point;

forward the at least one information packet to the access point defining the coverage area containing the subscriber unit if the information packet destination is to a subscriber unit within the coverage area of the access point in communication with the distribution point; and forward the at least one information packet to one of the additional distribution points in communication with the distribution point if the information packet destination is not to a subscriber unit within the coverage area of the access point in communication with the distribution point.

22. The communication system of claim 1 wherein at least one distribution point in the plurality of distribution points is further in communication with an Internet gateway, the distribution point further operative to exchange packets with the Internet gateway.

23. The communication system of claim 1 wherein at least one distribution point in the plurality of distribution points comprises an asynchronous transfer mode switch.

24. The communication system of claim 1 wherein at least one distribution point in the plurality of distribution points comprises an Internet protocol router.

25. The communication system of claim 1 wherein at least one distribution point in the plurality of distribution points comprises an Ethernet router.

26. The communication system of claim 1 wherein at least one distribution point in the plurality of distribution points comprises a TDM switch.

27. The communication system of claim 1 wherein each subscriber unit of the plurality of subscriber units is autonomously registered when the subscriber unit first enters the coverage area of a radio access point within the communication system.

28. The communication system of claim 27 wherein each subscriber unit of the plurality of subscriber units maintains registration as the subscriber unit moves from one coverage area into another coverage area.

29. The communication system of claim 27 wherein each subscriber unit of the plurality of subscriber units is autonomously deregistered when the subscriber unit leaves the communication system.

30. The communication system of claim 1 wherein a quality error bit rate is established for each subscriber unit based on the location of the subscriber unit within the communication system.

31. The communication system of claim 1 wherein a quality error bit rate is established for each subscriber unit based on a class of service.

32. The communication system of claim 1 wherein a quality error bit rate is established for each subscriber unit based on a grade of service.

33. The communication system of claim 1 wherein a quality error bit rate is established for each subscriber unit based on a rate of service.

34. The communication system of claim 1 wherein the subscriber unit is a fixed device.

35. The communication system of claim 1 wherein the subscriber unit is a non-fixed device.

36. The communication system of claim 1 wherein the distribution point dynamically allocates bandwidth when the information packet is forwarded to one of the additional distribution points in communication with the distribution point.

37. The communication system of claim 1 wherein bandwidth is dynamically allocated when an information packet is exchanged between one of the plurality of subscriber units and one of the plurality of access points.

38. A communication system comprising:
a plurality of distribution points, each distribution point in communication with at least one additional distribution point in the plurality of distribution points, each distribution point operative to rout information packets;
a plurality of subscriber units, each subscriber unit operative to communicate information packets to a destination subscriber unit through at least one distribution point in the plurality of distribution points; and
a supervisor in communication with each distribution point, the supervisor operative to identify the distribution point with which each subscriber unit is communicating and to provide each distribution point with a listing of to which of the at least one additional distribution point in communication with the distribution point information packets should be forwarded for each possible destination distribution point, the listing based on maintaining a minimum quality of service in a path to the destination distribution point.

39. A communication system comprising:
a plurality of distribution points, each distribution point in communication with at least one additional distribution point in the plurality of distribution points, each distribution point operative to forward each information packet received by the distribution point to another distribution point based on a destination address in the packet and on a logical address of each of the plurality of distribution points; and
a supervisor in communication with each distribution point, the supervisor operative to provide each distribution point with a listing of to which of the at least one additional distribution point in communication with the distribution point information packets should be forwarded for each possible destination distribution point, the listing based on maintaining a minimum quality of service in a path to the destination distribution point.

40. A method of automatically adding a new distribution point into a network of existing distribution points, each distribution point in the network of existing distribution points in communication with at least one additional distribution point in the network of existing distribution points, each distribution point in the network of existing distribution points operative to forward an information packet to one of the additional distribution points in the network of existing distribution points in communication with the distribution point in the network of existing distribution points based on a destination address in the information packet, the method comprising:
transmitting a sign-on signal from the new distribution point;
receiving the sign-on signal in at least one distribution point in the network of existing distribution points;
assigning a routing address to the new distribution point; and
providing each distribution point in the network of existing distribution points with an indication as to which additional distribution point in the network of existing distribution points each information packet having a destination address specifying the new distribution point is to be forwarded.

41. A method of automatically removing a distribution point from a network of distribution points, each distribution point in the network of distribution points in communication with at least one additional distribution point, each distribution point operative to forward an information packet to one of the additional distribution points in communication with the distribution point based on a destination address in the information packet, the method comprising:
detecting the absence of signal from a distribution point to be removed from the network;
determining a connectivity between distribution points remaining after removing the distribution point detected with the absence of signal; and
providing each remaining distribution point with an indication as to which distribution point in communication with the remaining distribution point each information packet having a destination address specifying the remaining distribution point is to be forwarded.

42. A distribution point for use in a communication system comprising a plurality of networked distribution points, the distribution point comprising:
at least one front end communication interface, each front end interface in communication with an access point, the access point in wireless communication with subscriber units currently assigned to the distribution point;
at least one back end communication interfaces, each back end interface in communication with a back haul communication device, at least one back haul communication device transferring packets with a back haul communication device in another of the plurality of networked distribution points; and
an intelligent packet switching device operative to
(a) determine a destination for each received packet,
(b) determine if the destination is to a subscriber unit currently assigned to the distribution point,
(c) send the packet to the subscriber unit if the subscriber unit is currently assigned to the distribution point,
(d) if the destination is not to a subscriber unit currently assigned to the distribution point, determine if the destination is to a subscriber unit currently assigned to any other distribution point in the communication system, and
(e) if the subscriber unit is currently assigned to any other distribution point in the communication system, identify another distribution point in back haul communication with the distribution point to which the packet should be forwarded and forward the packet to the identified distribution point.

43. The distribution point as in claim 42 wherein at least one front end communication interface is connected to an antenna, thereby permitting the distribution point to be in wireless communication with at least one radio access point.

44. The distribution point as in claim 42 wherein at least one front end communication interface is in wireline connection with a radio access point.

45. The distribution point as in claim 42 wherein transferring packets between a back haul communication device within the distribution point and a back haul communication device in another of the plurality of networked distribution points is a wireless transfer.

46. The distribution point as in claim 42 wherein transferring packets between a back haul communication device within the distribution point and a back haul communication device in another of the plurality of networked distribution points is through a wireline connection.

47. The distribution point as in claim 42 wherein the intelligent packet switching device comprises an asynchronous transfer mode switch.

48. The distribution point as in claim 42 wherein the intelligent packet switching device comprises an Internet protocol router.

49. The distribution point as in claim 42 wherein the intelligent packet switching device comprises an Ethernet router.

50. The distribution point as in claim 42 wherein the intelligent packet switching device comprises a TDM switch.

* * * * *